July 18, 1972   P. M. TSCHAMPER   3,677,891
ANTIJAM SLIDING SEAL STRUCTURE
Filed June 16, 1971   2 Sheets-Sheet 1
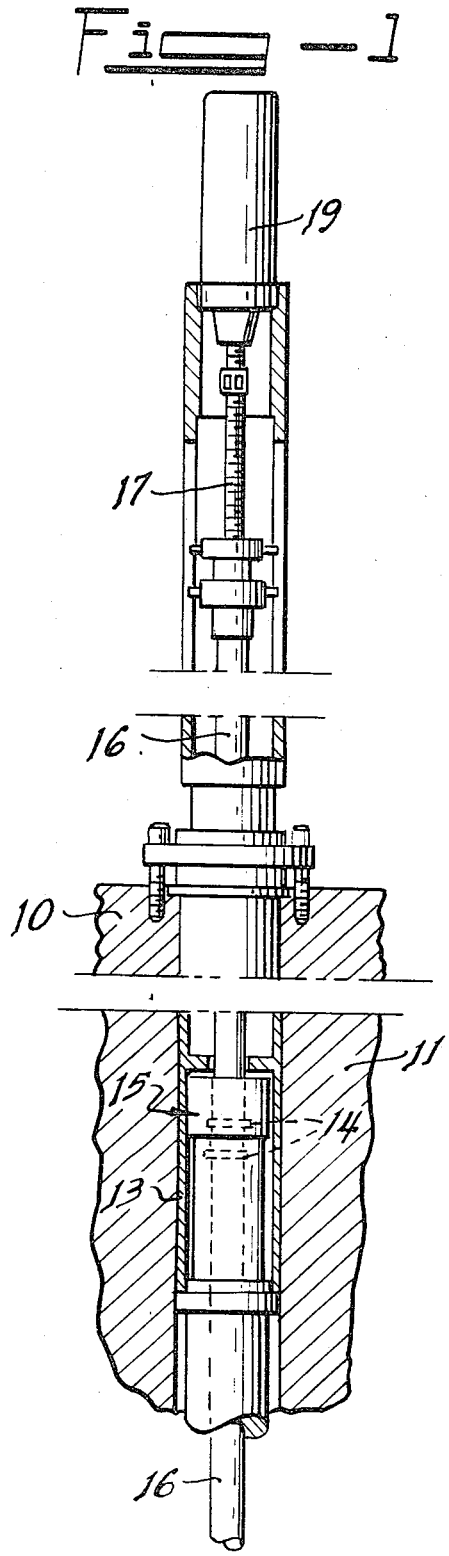
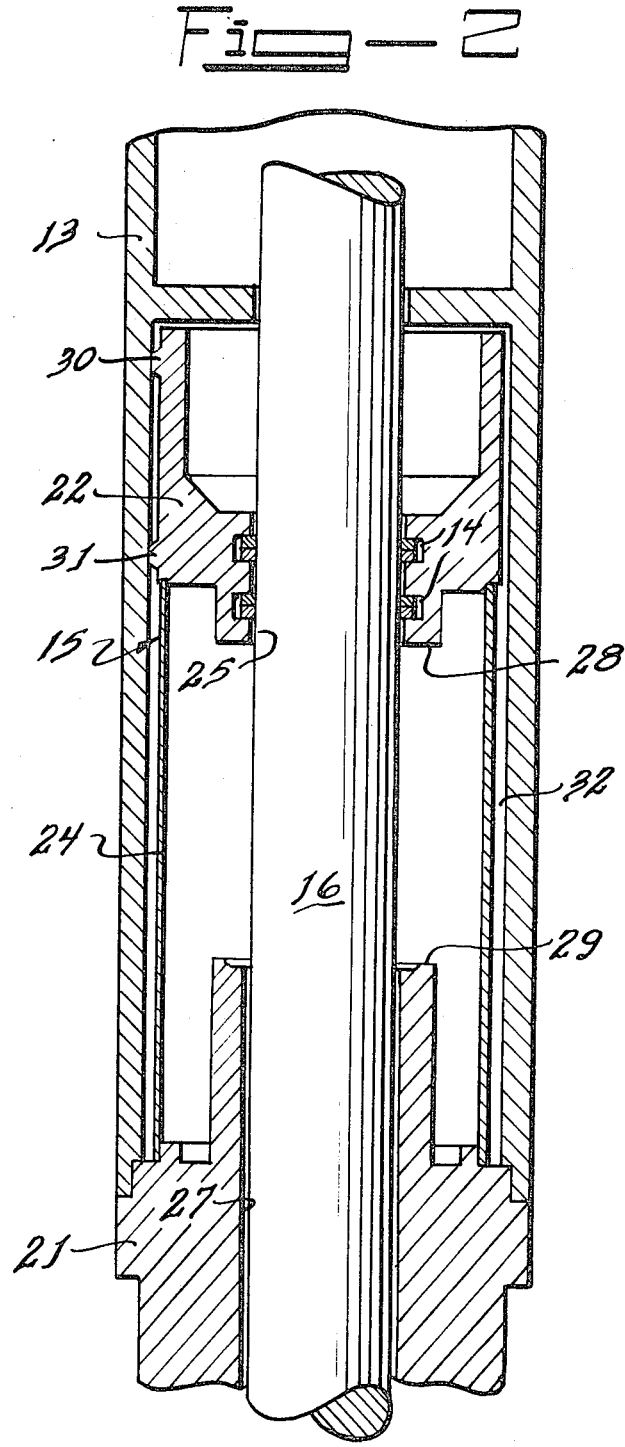
Inventor
Pierre M. Tschamper
Attorney

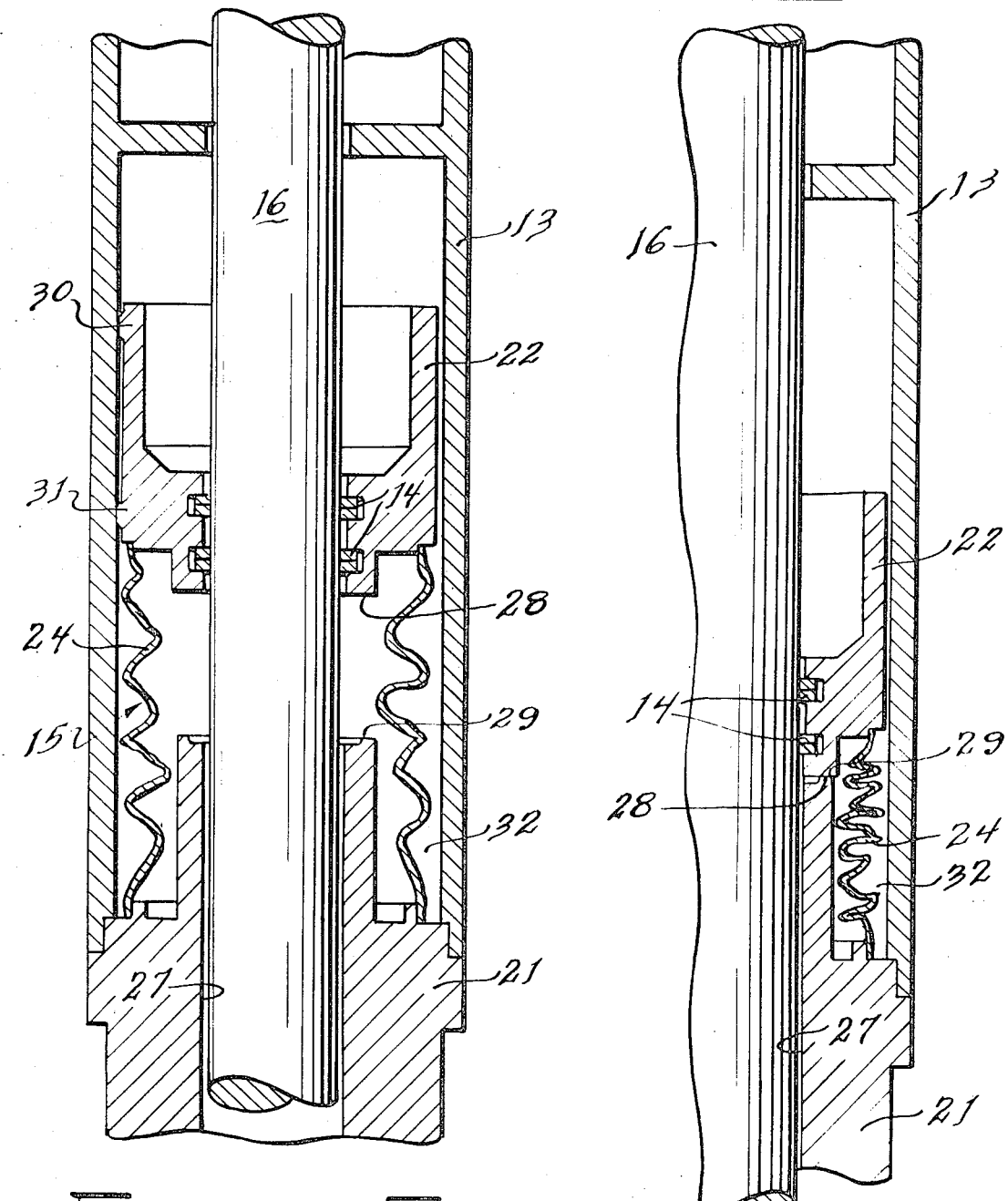

3,677,891
ANTIJAM SLIDING SEAL STRUCTURE
Pierre M. Tschamper, Lisle, Ill., assignor to the United
States of America as represented by the United States
Atomic Energy Commission
Filed June 16, 1971, Ser. No. 153,655
Int. Cl. G21c 7/00
U.S. Cl. 176—36 R                    4 Claims

ABSTRACT OF THE DISCLOSURE

The dynamic seals of a reactor control rod are supported by a collapsible seal tube. If the control rod is frozen to the seals, the force exerted on the control rod by the drive motor is sufficient to cause collapse of the seal tube. As the seal tube collapses, the structure supporting the seals is driven against a striking surface. The impact force developed when the seal support structure hits the striking surface is sufficient to break the control rod loose from the dynamic seals.

CONTRACTUAL ORIGIN OF THE INVENTION

The invention described herein was made in the course of, or under, a contract with the United States Atomic Energy Commission.

BACKGROUND OF THE INVENTION

In the combined head and upper shield structure of a sodium cooled nuclear reactor there are various penetrations. Many of these penetrations are provided for the control rod drive lines. An adapter tube forms the peripheral boundary of each of these penetations and also contains and supports a dynamic seal for the control rod. The dynamic seal effectively sparates the gas within the upper part of the adapter tube and/or reactor exterior from the gas within the reactor.

The gas within the reactor is in direct contact with the sodium coolant which is at a temperature of approximately 1200° F. Large temperature gradients below and close to the seal region induce convective currents in the lower gas space, thus permitting the inert gas to carry sodium vapor into the adapter tube. In the adapter tube, the sodium vapor condenses and freezes in regions that were moved through the seal or freezes on the seal itself. Thus, the dynamic seals are prone to jam and become locked, unless provided with a protective device. The tendency to become jammed is especially prevalent on control rod dynamic seals as the control rods are operated on an intermittent basis.

It is therefore an object of this invention to provide an improved dynamic sealing mechanism for reactor control rods.

Another object of this invention is to provide a reactor control rod sealing structure which acts to free jammed seal.

SUMMARY OF THE INVENTION

In practicing this invention, a nuclear reactor dynamic seal structure is provided which includes an adapter tube positioned in the reactor head and extending therethrough. A support ring with an opening therein is attached to the inner end of the adapter tube and sealed thereto. The control rod passes through the opening with the opening forming a guide for the control rod. A seal ring is positioned around the control rod and spaced apart from the support ring. A collapsible seal tube is positioned around the control rod with one end sealed to the support ring and the other end sealed to the seal ring to hold the seal ring spaced apart from the support ring. The seal ring contains seals which surround the control rod and form a dynamic seal to prevent the escape of gases from the reactor.

The seal tube is constructed to maintain the seal ring and support ring in a spaced apart relationship with a downward force on the seal ring of less than a predetermined value and to collapse with the downward force on the seal ring equal to a greater than the predetermined value. The collapse of the seal tube causes the seal ring to move toward the support ring. Striking surfaces on the support ring and the seal ring are driven together when the seal tube collapses. The impact force developed when the seal ring strikes the support ring will cause the control rod to break free from the dynamic seal relieving the jammed condition.

BRIEF DESCRIPTION OF THE DRAWINGS

The invention is illustrated in the drawings of which:
FIG. 1 is a cross sectional view of the control rod and drive mechanism structure of a nuclear reactor;
FIG. 2 is a cross sectional view of the sealing structure for a control rod; and
FIGS. 3 and 4 are cross sectional views of the sealing structure of this invention showing the action of the parts during collapse of the seal tube.

DETAILED DESCRIPTION OF THE INVENTION

Referring to FIG. 1 there is shown the head and upper shield structure of a sodium cooled nuclear reactor. An adapter tube 13 forms a peripheral boundary of a penetration required for a control rod 16. Adapter tube 13 extends through the shield structure 10 and the head structure 11 of the nuclear reactor. A control rod 16 extends through the adapter tube 13 and into the nuclear reactor. The adapter tube 13 includes a seal assembly 15 and dynamic seals 14 which surround the control rod 16 to seal the rod opening. The dynamic seals 14 act to prevent the inert gases and sodium vapor from leaking out of the reactor. A control rod driving mechanism 17 actuated by a driving motor 19 is used to move the control rod up and down to position it within the reactor as desired.

Referring to FIG. 2 there is shown a cross sectional view of the seal assembly 15. The adapter tube 13 forms the peripheral boundary of the penetration required for control rod 16. A support ring 21 is positioned at the lower end of the adapter tube and contains an opening 27 through which control rod 16 passes. The opening 27 is a sliding fit for control rod 16 to give mechanical support to the control rod, however, there is no sealing action between the support ring 21 and control rod 16. A seal ring structure 22 is positioned above the support ring structure 21 and is spaced apart therefrom by a collapsible seal tube 24. The seal ring 22 has an opening 25 through which control rod 16 passes. Dynamic seals 14 are placed within opening 25 and provide a sealing action for control rod 16 to prevent gases from the reactor, such as inert argon and sodium vapor, from passing out of the reactor.

Seal tube 24 is sealed to the support ring 21 and the seal ring 22. Thus the only gap through which gases can leave the reactor is through the seals 14 which in normal operation act to prevent the escape of these gases. Collapsible seal tube 24 spaces the seal ring 22 and the support ring 21 in their relative positions.

In normal operation control rod 16 moves up and down through the seals 14 with little resistance. However, control rods are moved intermittently and thus are subject to having deposits built up on various parts of the rod particularly around the seal ring area. Since this area of the reactor is relatively cool, sodium gases may condense on the control rods and seals 14 at the point where the control rod passes through the seal ring "freezing" the control rod and seal ring together so that the control rod cannot be moved through the sealing ring structure.

Referring to FIGS. 1 through 4 the antijamming feature of the invention will be explained. Seal tube 24 is constructed so that when the force on the tube exceeds a predetermined amount the tube will collapse. This predetermined force is greater than the force required to drive the control rod in normal operation. Drive motor 19 has sufficient power to exert a force on control rod 16 greater than this predetermined force required to collapse seal tube 24. If the force required to break control rod 16 loose from the seals 14 and seal ring 22 exceeds this predetermined force, seal tube 24 will collapse as shown in FIGS. 3 and 4. The collapse of seal tube 24 imparts a downward velocity to seal ring 22.

Seal ring 22 has a hardened striking surface 28 and support ring 21 also has a hardened striking surface 29. As the seal ring 22 moves downward, striking surfaces 28 and 29 will meet to stop the movement of seal ring 22. The sudden stop of seal ring 22 will impart a very large force tending to separate the control rod 16 and the seal ring 22.

Seal ring 21 is supported in the adapter tube 13 by projections 30 and 31. These peripheral sliding surfaces extend around the seal ring 22 but do not form a continuous ring so that the gases within space 32 can readily flow out as the seal ring moves downward. This prevents excessive damping.

Assuming that the control rod 16 is frozen in the seals 14, seal tube 24 would first offer a resistance up to its plastic flow load. If this resistance were not high enough to break control rod 16 free of seals 14, the seal tube 24 would start to buckle and thus permit the seal ring 22 to be accelerated into a downward motion. After seal tube 24 buckles, very little resistance will be offered and seal ring 22 will ultimately ram against support ring 21. The deceleration forces will cause an extremely high shear in the frozen seal since the mass of the entire control rod system is involved. Hence the frozen sliding surfaces will be separated and a cooler and cleaner part of the control rod will slip through the seal.

The embodiments of the invention in which an exclusive property or privilege is claimed are defined as follows:

1. An antijam sliding seal structure comprising, an adatper tube, a support ring sealed to said adapter tube and having a first opening therein, a seal ring having a second opening therein and positioned in said adapter tube in spaced apart relationship to said support ring, a rod passing through said first and second openings, a seal tube positioned in said adapter tube and surrounding said rod, said seal tube having a first end sealed to said support ring and a second end sealed to said seal ring, said seal tube acting to hold said seal ring in said spaced apart relationship to said support ring, drive means coupled to said rod for moving the same through said first and second openings, said drive motor being capable of exerting a force on said rod equal to or greater than a predetermined force, said seal ring including a dynamic seal structure in said second opening and surrounding said rod to prevent leakage of gas through said second opening along said rod, said dynamic seal structure being constructed so that the frictional force between said rod and said dynamic seal structure is normally less than said predetermined force, said seal tube being constructed to maintain said support ring and said seal ring in said spaced apart relationship with a fore on said seal ring of less than said predetermined force and to collapse with a force on said seal ring equal to or greater than said predetermined force, said collapse of said seal tube causing said seal ring to contact said support ring to develop an impact force at the interface of said dynamic seal structure and said rod.

2. The antijam structure of claim 1 wherein, said support ring and said seal ring each include hardened striking surfaces, said movement of said seal ring with said seal tube collapsed causing said seal ring striking surface to contact said support ring striking surface.

3. The antijam structure of claim 2 wherein, said seal ring includes a peripheral guide in sliding contact with said adapter tube to maintain said seal ring in desired alignment with said adapter tube and said support ring, said peripheral guide having openings therein to permit gas flow therethrough during movement of said seal ring.

4. The antijam structure of claim 3 wherein, said adapter tube is positioned in a nuclear reactor head to provide means for penetrating said nuclear reactor head, and said rod is a control rod extending into said reactor, said reactor having sodium vapor therein with said control rod and said dynamic seal structure being exposed to said sodium vapor, said dynamic seal structure further being at a temperature lower than the freezing temperature of sodium whereby sodium deposits can build up at said rod and dynamic seal interface to cause jamming of said rod.

References Cited

UNITED STATES PATENTS 3,280,002   10/1966   Huffer et al.
3,010,887   11/1961   Baumgarten et al.

CARL D. QUARFORTH, Primary Examiner

H. E. BEHREND, Assistant Examiner

U.S. Cl. X.R.

176—87; 227—24; 308—3.5